United States Patent [19]
Imanishi et al.

[11] Patent Number: 6,032,981
[45] Date of Patent: *Mar. 7, 2000

[54] TILT-TYPE STEERING DEVICE

[75] Inventors: Hiroshi Imanishi; Kimitaka Andoh; Taku Uchiyama, all of Wako, Japan

[73] Assignee: Honda Giken Kogyo Kabushiki Kaisha, Tokyo, Japan

[ * ] Notice: This patent is subject to a terminal disclaimer.

[21] Appl. No.: 08/948,674

[22] Filed: Oct. 10, 1997

[30] Foreign Application Priority Data

Oct. 11, 1996 [JP] Japan ...................................... 8-270284

[51] Int. Cl.⁷ ................................. B62D 1/11; B62D 1/16
[52] U.S. Cl. ............................. 280/777; 280/779; 74/492
[58] Field of Search ..................................... 280/775, 777, 280/779, 780; 74/492, 493

[56] References Cited

U.S. PATENT DOCUMENTS

| | | | |
|---|---|---|---|
| 4,561,323 | 12/1985 | Stromberg | 74/493 |
| 5,503,431 | 4/1996 | Yamamoto | 280/777 |
| 5,876,065 | 2/1999 | Ogura et al. | 280/777 |

*Primary Examiner*—Lanna Mai
*Assistant Examiner*—Faye M. Fleming
*Attorney, Agent, or Firm*—Armstrong, Westerman, Hattori, McLeland & Naughton

[57] ABSTRACT

A steering shaft is supported for tilting-up and tilting-down movements by a pivot mechanism, and connected at its front end to a steering gear box by a joint shaft. The joint shaft passes through an opening of a dashboard and is provided with a stopper facing a rear portion of the opening. When the dashboard is driven backwards as a result of collision of the vehicle, the joint shaft having the stopper urged by the opening is driven backward along with the dashboard. Thus, the steering gear box can be moved rearwards and downwards to inhibit the forward and downward pulling of the joint shaft, thereby preventing tilting-up of the steering shaft.

2 Claims, 9 Drawing Sheets

TILT-TYPE STEERING DEVICE

BACKGROUND OF THE INVENTION

1. Field of the Invention

The present invention relates to a tilt-type steering device in which the tilting-up angle of a steering shaft can be regulated.

2. Description of the Related Art

FIG. 9 illustrates a conventional tilt-type steering device. A steering shaft 02 disposed in a forward declined manner and having a steering wheel 01 at its rear end is supported at its front portion turnably in upward and downward directions by a pivot mechanism 03, and the position of the rear portion thereof is regulated up and down by a tilt mechanism 04. The front end of the steering shaft 02 is connected to a rear end of the joint shaft 05 through a rear universal joint 06, and a front end of the joint shaft 05 is connected to a steering gear box 07 through a front universal joint 08. The joint shaft 05 is declined forwards and has an intermediate portion passing through an opening 010 in a dashboard 09.

When a driver advancing under the action of inertia upon collision of the vehicle pushes the steering wheel 01 forwards, the steering shaft 02 is pushed forward along with the steering wheel 01. At this time, shock energy is absorbed by a friction force and a flexing deformation applied to an absorbing plate mounted in the tilt mechanism 04.

When the collision of the vehicle occurs, the dashboard 09 is moved rearwards by a shock. Further, when the steering gear box 07 is moved rearwards and downwards, the joint shaft 05 is pulled in an axial direction. When the joint shaft 05 is pulled in the axial direction, the position of the rear universal joint 06 is lowered, and the pivot mechanism 03 is also pulled down. This causes the steering shaft 02 to be tilted upwards while being moved forwards and downwards, and the position of the steering wheel 01 therefore rises.

When the steering shaft 02 has been tilted upwards in this manner, the load consisting of the push of the steering wheel 01 forwards by the driver upon the collision of the vehicle is difficult to transmit in an axial direction of the steering shaft 02. As a result, not only is there a reduction in the shock absorbing ability of the absorbing plate mounted in the tilt mechanism 04, but there is also a possibility that an air bag mounted in the steering wheel 01 does not properly expand toward the driver.

The present invention has been developed with the above circumstance in view, and it is an object of the present invention to prevent the steering shaft from being tilted due to the collision of the vehicle.

SUMMARY OF THE INVENTION

To achieve the above object, when the dashboard is moved rearwards and the steering gear box is moved rearwards and downwards upon the collision of the vehicle, the joint shaft having the stopper urged by the opening of the dashboard is retreated along with the dashboard, whereby pulling-down of the steering shaft by the rearward and downward movement of the steering bear box does not occur, and the tilting-up motion of the steering shaft is prevented. Thus, for example, shock absorption provided by both the axial sliding movement of the steering shaft and the air bag can be effectively accomplished.

When the dashboard is pushed rearward by the collision of the vehicle to cause the opening to urge the stopper, the shear pin is broken, thereby breaking the upper shaft portion away from the lower shaft portion. As a result, the upper shaft portion having the stopper urged by the opening can be freely pushed rearward along with the dashboard, thereby further reliably preventing the tilting-up of the steering shaft.

BRIEF DESCRIPTION OF THE DRAWINGS

A preferred embodiment of the present invention will now be describe with reference to the accompanying drawings.

FIGS. 1 to 8 illustrate the preferred exemplary embodiment of the present invention, while

FIG. 1 is a side view of the entire steering device;

FIG. 2 is an enlarged view of a portion indicated by 2 in FIG. 1;

FIG. 3 is a view taken in a direction of an arrow 3 in FIG. 2;

FIG. 4 is a view taken in a direction of an arrow 4 in FIG. 2;

FIG. 5 is a sectional view taken along a line 5—5 in FIG. 2;

FIG. 6 is an enlarged view of a portion indicated by 6 in FIG. 1;

FIG. 7 is a sectional view taken along a line 7—7 in FIG. 6;

FIG. 8 is a diagram for explaining the operation; and

FIG. 9 is a diagram for explaining the operation of the prior art.

DETAILED DESCRIPTION OF THE PREFERRED EMBODIMENT

Figure 1:
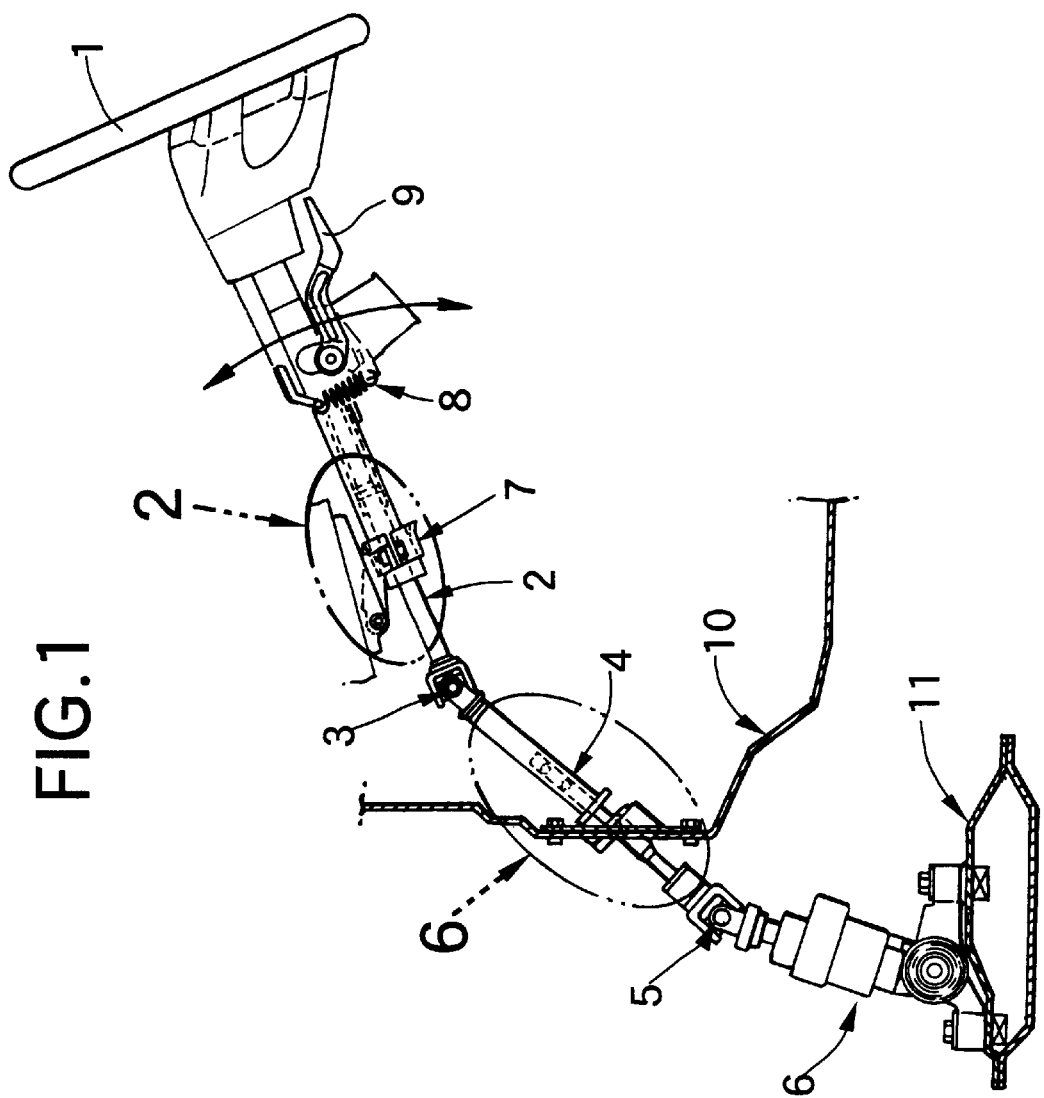

As shown in FIG. 1, a steering device in an automobile vehicle includes a steering wheel 1 operated by a driver, a steering shaft 2 having the steering wheel 1 provided at its rear end, a joint shaft 4 connected at its rear end to a front end of the steering shaft 2 through a rear universal joint 3, and a steering gear box 6 connected to a front end of the joint shaft 4 through a front universal joint 5. The steering shaft 2 is disposed in a forward declined manner such that a portion closer to the steering wheel 1 is higher in level. The joint shaft 4 is disposed in a forward declined manner at a larger gradient such that a portion closer to the steering gear box 6 is lower in level.

The steering shaft 2 is supported at its front and rear portions by a pivot mechanism 7 and a tilt mechanism 8, respectively. If a tilt lever 9 of the tilt mechanism 8 is operated to move the rear portion of the steering shaft 2 up and down in a direction of the double arrow shown in FIG. 1, the steering shaft 2 is turned about the pivot mechanism 7 and thus tilted upward and tilted downward. The joint shaft 4 has an intermediate portion which passes through an opening $35_1$ (see FIG. 6) defined in a dashboard 10 from the side of a vehicle compartment toward an engine compartment. The steering gear box 6 is fixed to a vehicle body frame 11 extending laterally of a vehicle body.

Figure 2:
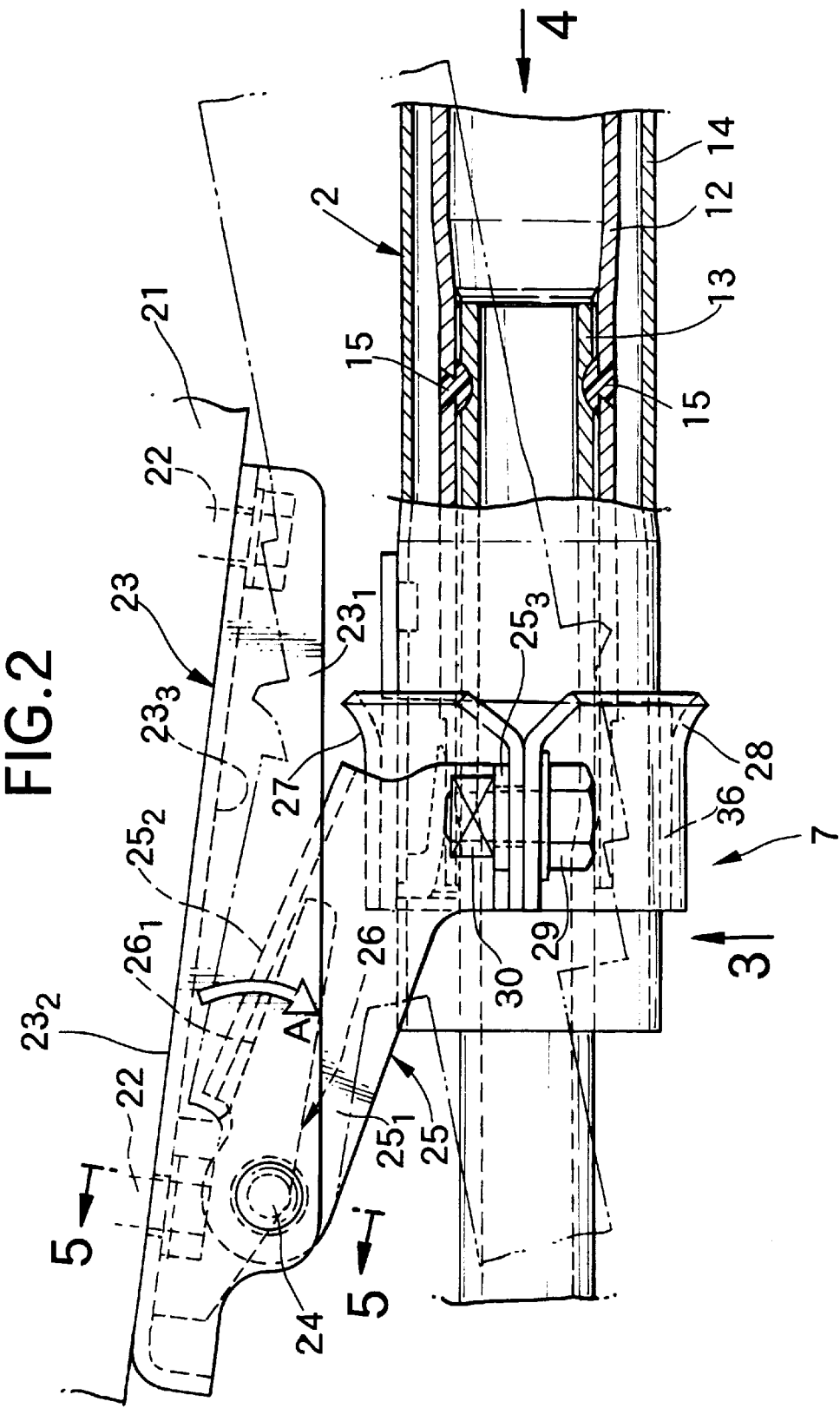
Figure 3:
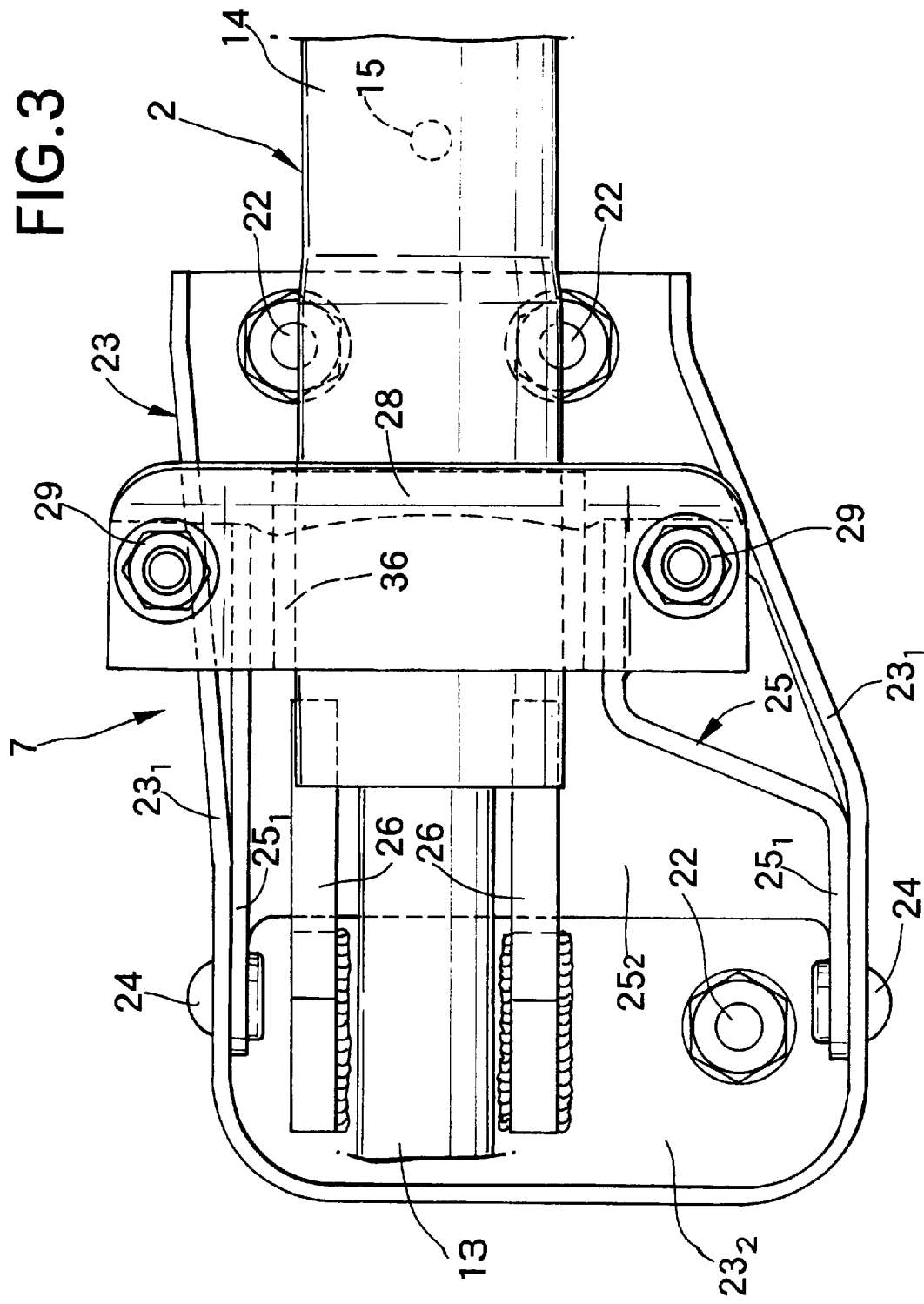
Figure 4:
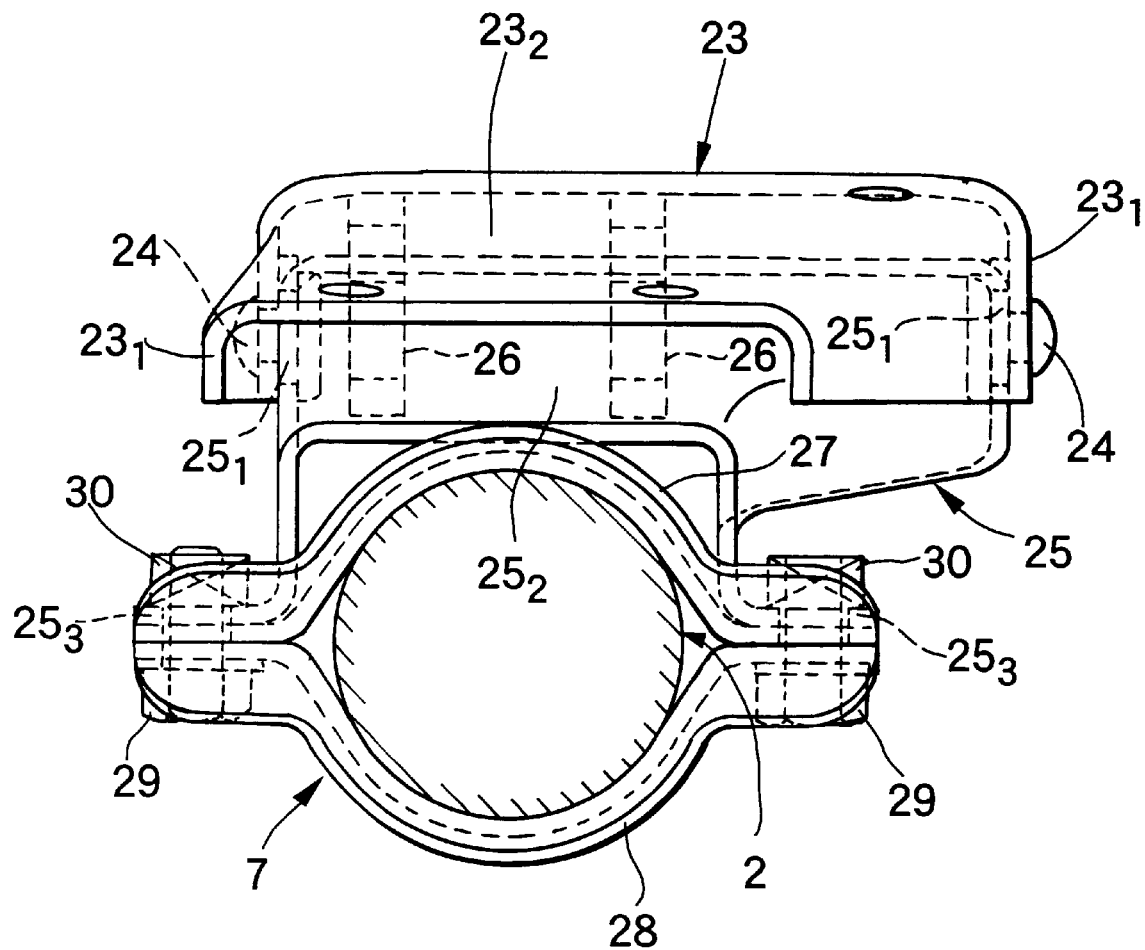
Figure 5:
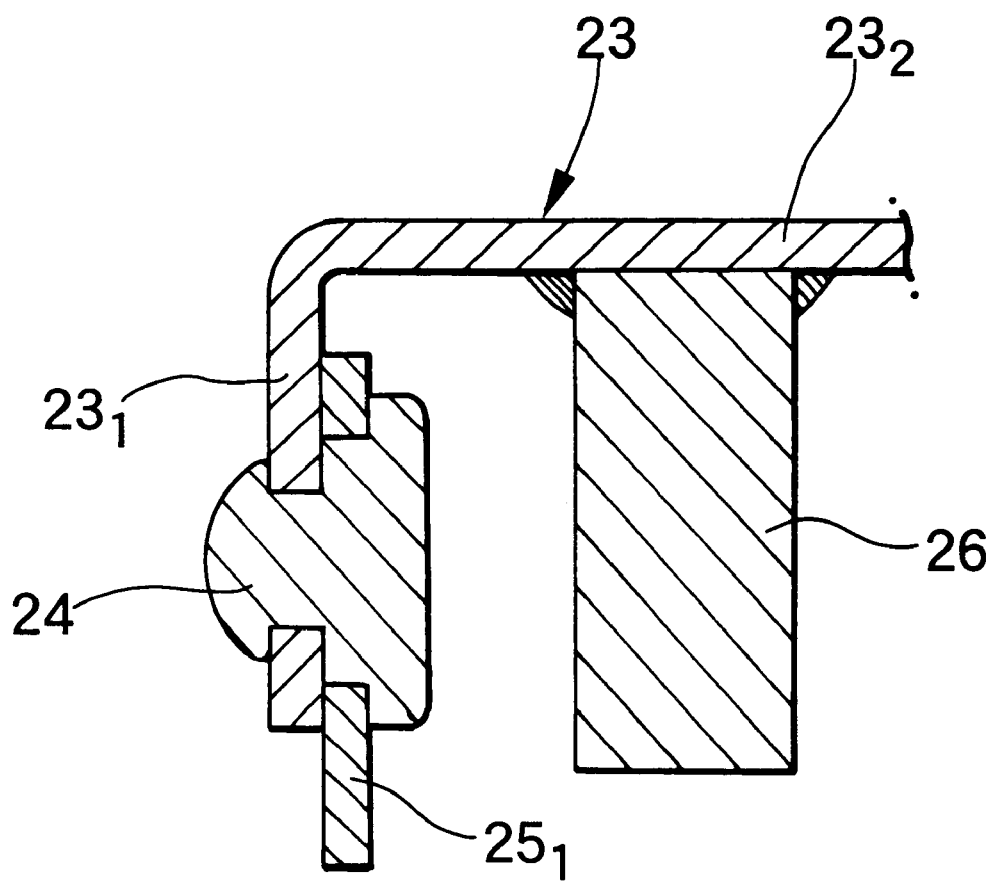

As shown in FIG. 2, the steering shaft 2 is comprised of an upper shaft portion 12 connected to the steering wheel 1, a lower shaft portion 13 connected to the joint shaft 4, and a steering pipe 14 in which the upper shaft portion 12 and the lower shaft portion 13 are rotatably accommodated. An outer periphery of a rear end of the lower shaft portion 13 is spline-coupled and axially non-slidably fixed to an inner periphery of the front end of the upper shaft portion 12 by shear pins 15,15 made of a resin.

The structure of the pivot mechanism 7 will be described below with reference to FIGS. 2 to 5.

The pivot mechanism 7 includes a base member 23 fixed to a steering hanger 21 mounted within an instrument panel by three bolts 22. Left and right sidewalls $25_1, 25_1$ of an arm member 25 are supported to the left and right sidewalls $23_1, 23_1$ of the base member 23 turnably in upward and downward directions through a pair of fulcrum pins 24,24. A pair of left and right stoppers 26,26 are fixed to a ceiling wall $23_2$ of the base member 23 by welding. A ceiling wall $25_2$ of the arm member 25 is disposed between upward-turned stopper faces $26_1, 26_1$ formed on the stoppers 26,26 and a stopper face $23_3$ formed in a downward-turned manner on the ceiling wall $23_2$ of the base member 23 (see FIG. 2). Therefore, the arm member 25 can be turned in upward and downward directions between a lower limit position in which the ceiling wall $25_2$ abuts against the stopper faces $26_1, 26_1$ of the stoppers 26,26 and an upper limit position in which the ceiling wall $25_2$ abuts against the stopper face $23_3$ of the base member 23.

An upper holder 27 and a lower holder 28, which are half-cylindrically formed on a pair of left and right flanges $25_3, 25_3$ formed at the rear end of the arm member 25, are commonly clamped by bolts 29,29 and nuts 30,30. A retainer collar 36 made of a synthetic resin fitted over an outer periphery of a front end of the steering pipe 14 is clamped and fixed between the upper holder 27 and the lower holder 28.

Figure 6:
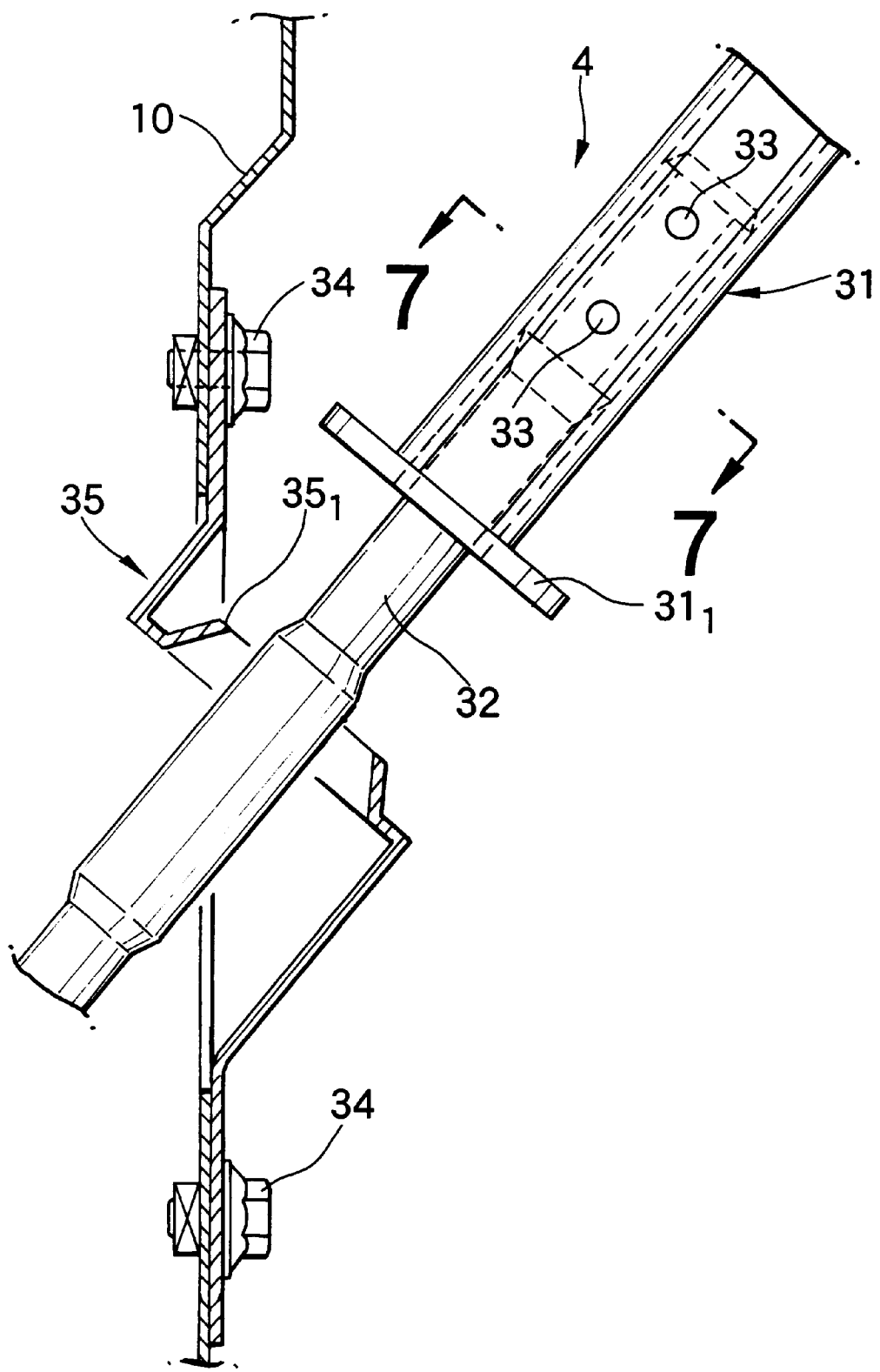
Figure 7:
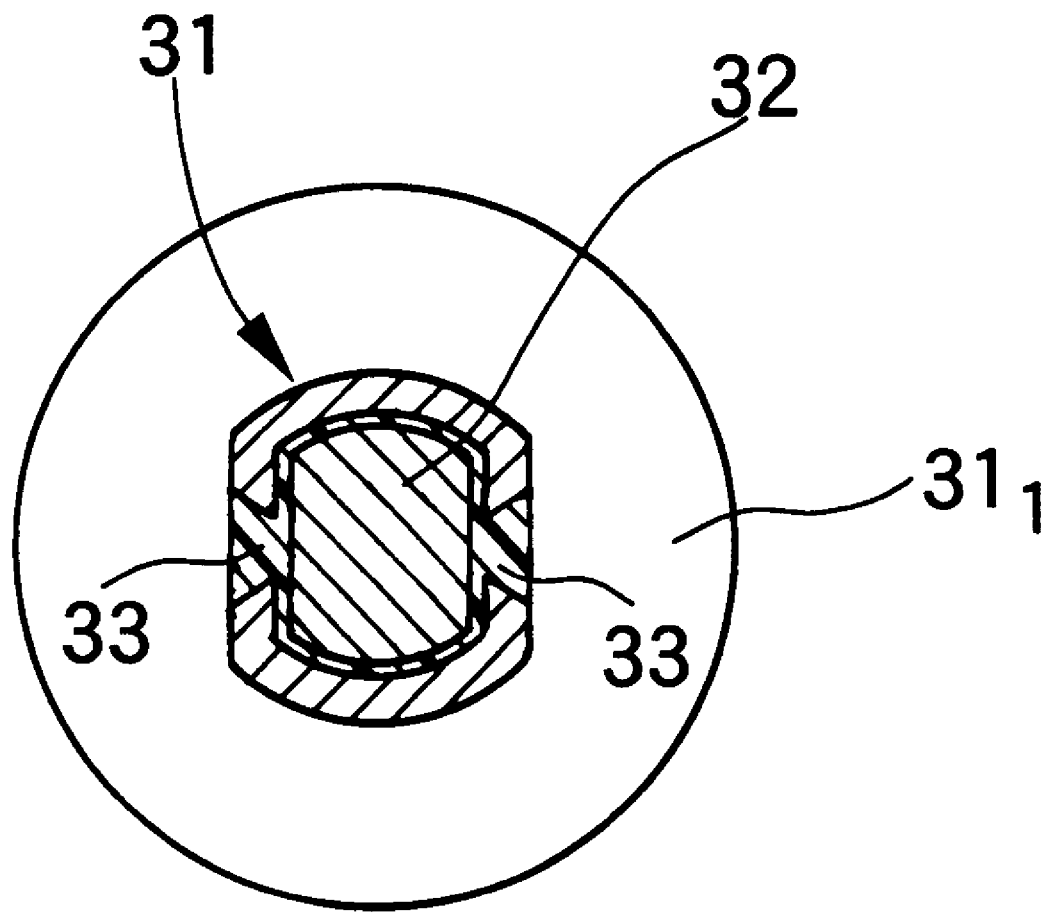

The structure of the joint shaft 4 will be described below with reference to FIGS. 6 and 7.

The joint shaft 4 is comprised of an upper shaft portion 31 and a lower shaft portion 32 which are axially non-slidably coupled to each other by two shear pins 33,33, with an outer periphery of an upper end of the lower shaft portion 32 being relatively non-rotatably coupled to an inner periphery of a lower end of the upper shaft 31. A disk-like stopper $31_1$ is integrally formed at the lower end of the upper shaft portion 31. An opening-defined member 35 is fixed to the dashboard 10 by a plurality of bolts 34, and the lower shaft portion 32 passes through the opening $35_1$ defined in the opening-defined member 35 with a predetermining gap left therebetween. In this state, the stopper $31_1$ is opposed to a rear portion of the opening $35_1$ with a slight gap left therebetween.

Figure 8:
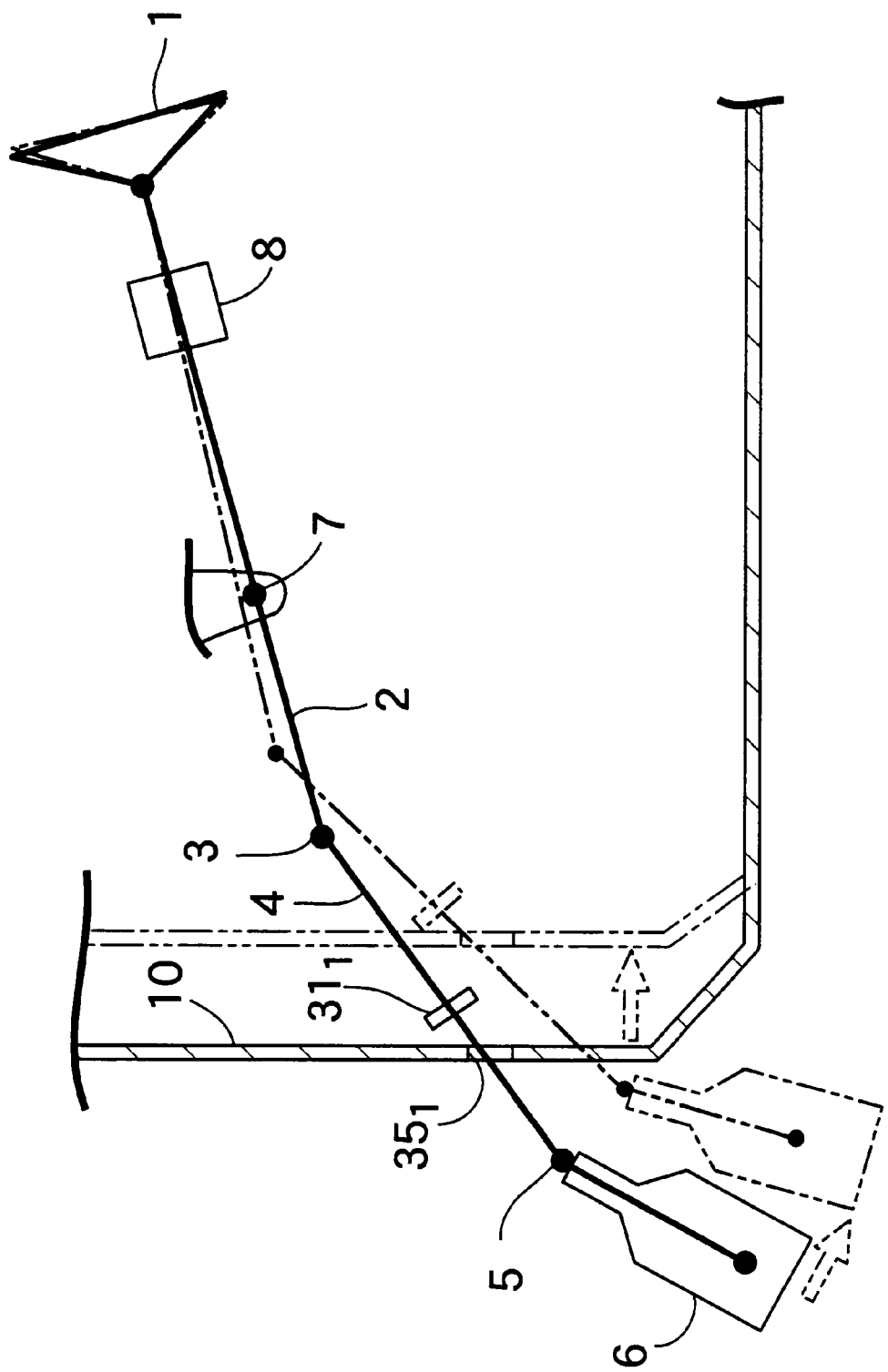
Figure 9:
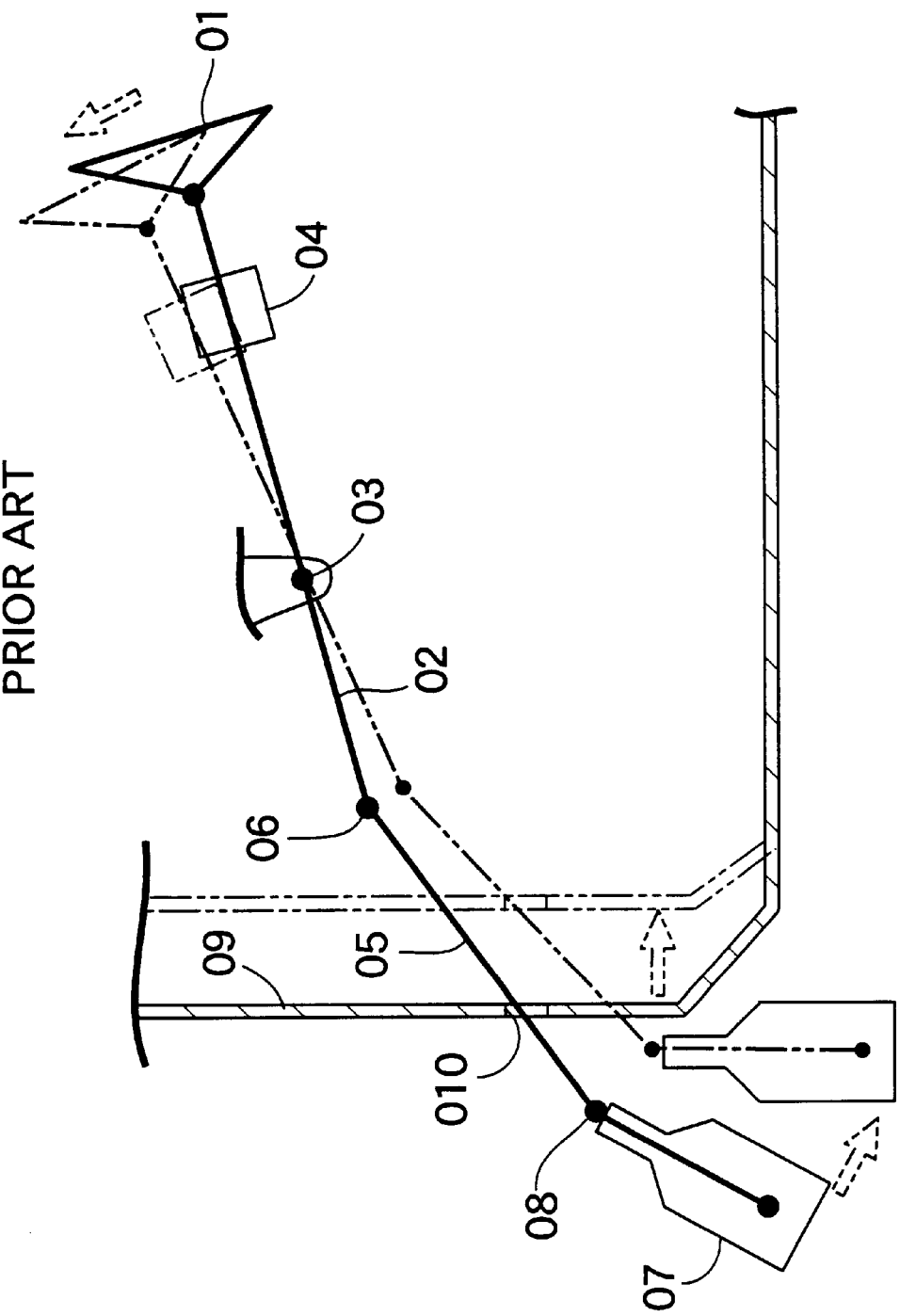
FIG. 9 illustrates prior art.

The operation of the preferred exemplary embodiment of the present invention having the above-described arrangement will be described below with reference to FIG. 8.

When the dashboard 10 is moved rearwards by a shock produced by the collision of the vehicle, the opening $35_1$ urges the stopper $31_1$ provided on the upper shaft portion 31 of the joint shaft 4 rearwards, so that the upper shaft portion 12 and the lower shaft portion 13 of the steering shaft 2 are compressed to break the shear pins 15,15. In addition, the steering gear box 6 is moved rearwards and downwards by the shock produced by the collision, so that the upper shaft portion 31 and the lower shaft portion 32 of the joint shaft 4 are pulled to break the shear pins 33,33, and the upper shaft portion 31 of the joint shaft 4 is retreated rearwards and upwards relative to the lower shaft portion 32. As a result, as shown in FIG. 8, the position of the rear universal joint 3 is raised along with the upper shaft portion 31 retreating, and the steering shaft 2 is slightly turned in a tilting-down direction (in a direction of lowering movement of the steering wheel 1) about the pivot mechanism 7. Then, the air bag mounted in the steering wheel 1 is inflated. When the driver advances toward the air bag under the action of an inertia, the advancing energy is absorbed by the deformation of the air bag and of the steering wheel 1, and also absorbed by stroking of an absorbing plate mounted at the tilt mechanism 8.

When the arm member 25 is turned in a direction of an arrow A in FIG. 2 about the fulcrum pin 24 depending upon the circumstances of the collision, the rear universal joint 3 may be pushed forwards and downwards, and the steering shaft 2 may be turned in a tilting-up direction (in a direction of rising movement of the steering wheel 1) about the pivot mechanism 7. According to this embodiment, however, the forward and downward movement of the rear universal joint 3 is inhibited by the abutment of the ceiling wall $25_2$ of the arm member 25 of the pivot mechanism 7 against the stopper face $26_1$ of the stopper 26, thereby inhibiting the turning of the steering shaft 2 in the tilting-up direction. Thus, it is possible to inhibit the tilting of the steering shaft 2 and to direct the axis of the steering shaft 2 to the driver, upon the collision of the vehicle. As a result, the load of the driver advancing under the action of inertia can be applied in an axial direction of the steering shaft 2, the absorption of the shock by the absorbing plate of the tilt mechanism 8 can be effectively performed, and the air bag inflated from the steering wheel 1 can be directed properly toward the driver.

Although the preferred exemplary embodiment of the present invention has been described in detail, it should be understood that the present invention is not limited to the above-described embodiment, and the various modifications in design may be made without departing from the spirit and scope of the invention defined in claims.

What is claimed is:

1. A tilt-type steering device, comprising:

a steering wheel, a steering shaft disposed in a forward declined manner and having the steering wheel at a rear end of the steering shaft, a pivot mechanism supporting the steering shaft at a forward portion of tilting-up and tilting-down movements, a tilt mechanism permitting a rear portion of the steering shaft to be moved up and down, a joint shaft connected in a forward declined manner to a front end of the steering shaft and passing through an opening defined in a dashboard, and a steering gear box connected to a front end of the joint shaft, wherein said joint shaft has a stopper which is provided thereon and located behind said opening, such that said stopper is urged rearwards by the dashboard which is driven backwards upon collision of a vehicle.

2. A tilt-type steering device according to claim 1, wherein said joint shaft comprises an upper shaft portion connected to said steering shaft, and a lower shaft portion connected to said steering gear box, said upper shaft portion and said lower shaft portion being integrally coupled to each other through a breakable shear pin, and said stopper is provided on said upper shaft portion.

* * * * *